MICROSTRIP OSCILLATOR

Filed Oct. 5, 1962

INVENTORS
MORRIS CAMPI
JOSEPH J. WITTE
BY S. J. Rotondi, A. J. Rupont & J. P. Edgerton 3,213,389

MICROSTRIP OSCILLATOR

Morris Campi, Washington, D.C., and Joseph J. Witte, Silver Spring, Md., assignors to the United States of America as represented by the Secretary of the Army Filed Oct. 5, 1962, Ser. No. 228,771
7 Claims. (Cl. 331—99)
(Granted under Title 35, U.S. Code (1952), sec. 266)

The invention described herein may be manufactured and used by or for the Government of the United States of America for governmental purposes without the payment to us of any royalty thereon.

This invention relates to oscillators and more particularly to an improved construction for very high frequency vacuum tube oscillators.

The operation of vacuum tube oscillators at very high frequencies is complicated by transit-time effects of the tube, the inductance of the tube leads, and the capacitance of both the leads and the tube electrodes. As a result, oscillators for the higher frequencies typically employ tubes specially designed for high frequency operation, and make use of circuits and circuit techniques that are different from the circuit arrangements in common use at the lower frequencies.

A typical widely used circuit in the "L band" region is the triode coaxial-cavity oscillator. These triode oscillators compare favorably with other frequency generators for certain applications because of their relative simplicity and small size. But, as is well known in the art, the mechanical aspects of construction of these and similar oscillators is of critical importance for stable operation. There must be overall mechanically rigidity and strength in the oscillator, and these requirements increase its cost and weight. For example, the dimensions of the cavity must be held to very small tolerances so as to make intimate contact with the tube itself. When, due to intended environment, the possibility of even slight mechanical vibration is introduced, even greater rigidity is required. Strong castings that have webs and ridges for additional stiffness are needed. Additionally, these castings require a great deal of machining, and all these factors make the finished oscillator rather heavy and very expensive.

It is therefore an object of this invention to provide a novel ultra high frequency oscillator which is light weight, inexpensive to produce, and capable of performing under severe environmental conditions.

Another object of this invention is to produce a very high frequency oscillator which may be produced by printed circuit techniques.

A further object of this invention is a ultra high frequency oscillator whose circuit components do not change value due to mechanical force.

These and other objects of the present invention are accomplished by using strip tranmission lines to form a resonant circuit impedance and a feed-back determining impedance for a triode oscillator. By making the elements in this manner, it will become apparent that not only is the oscillator of extremely simple construction, but also the possibility of adverse effects due to mechanical movement is virtually eliminated.

The specific nature of the invention, as well as other objects, uses and advantages thereof, will clearly appear from the following description and from the accompanying drawing, in which.

It is common in the prior art to make capacitors and inductors for various circuits by printed circuit techniques; however, in the ultra high frequencies, lumped constant components, whether of the conventional type or produced by printed circuit techniques, begin to change their values and are difficult to realize. To overcome these difficulties, as well as the mechanical difficulties, strip transmission lines are used as long line elements in the present invention. The strip transmission line is one of the newer transmission line types but is one about which a considerable amount of technology exists. Two basic types of strip transmission lines exist: the so-called microstrip line which consists of a strip conductor over a single ground plane, and the type consisting of strip conductor placed symmetrically between two ground planes. Either of these two types of strip transmission lines may be used to realize this invention. For ease of illustration and description, the embodiments shown employ the microstrip type. In accordance with the teaching of the invention, the strip conductors are matched to the interelectrode capacitance of the vacuum tube to produce an oscillator. The microstrip length, either short or open ended, is made a fractional value of the wave length of the operating frequency of the oscillator. For example, a shorted-end microstrip less than $\lambda/4$ and an open-end microstrip greater than $\lambda/4$ have inductive reactance properties. Conversely, a shorted-end microstrip greater than $\lambda/4$ and an open-end microstrip less than $\lambda/4$ have capacitive reactance properties. The magnitude of the reactances depends upon the microstrip length related to $\lambda/4$.

Figure 1:
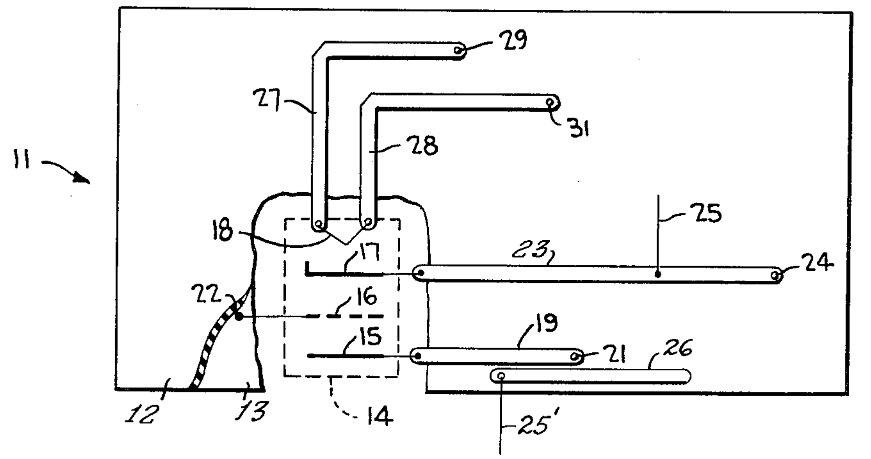
FIG. 1 is a plan view of one embodiment of an oscillator in accordance with the invention.

FIG. 1 shows a preferred embodiment of an "L band" triode oscillator constructed in accordance with the teaching of this invention. The oscillator 11 is made up simply of a triode 14 and a plurality of microstrip lines. The microstrip lines are built up on a sheet of insulation 12 which has a dielectric constant of about 2.5 and low loss characteristics at high frequency. The sheet 12 is of extended surface area, and quite thin. Teflon, polystyrene, polyethylene, or other similar insulators are well adapted to the high frequency use contemplated.

On one side of the sheet 12 is a thin metal ground plane 13. The metal ground plane 13 is large in surface area and underlies and extends well beyond the boundary of the circuit printed on the upper surface of the sheet 12. The ground plane 13 may conveniently comprise copper foil firmly bonded as by a thermosetting adhesive to one side of the insulating sheet. To the other side of the sheet 12 the microstrip lines, which also may be of copper foil, are tailored to the desired sizes and shapes and firmly glued to the face of the sheet. Alternately, the microstrip lines may be prepared by applying an ink of powdered metal appropriately painted on the sheet 12 and baked in a reducing atmosphere to bond the metal to the sheet in low resistance strips. Another alternative is to provide the upper surface of the sheet 12 with a copper cladding and etch away the undesired material after the pattern of the microstrip lines is applied by either a silk screen process or a photographic process. These and any of a number of similar printed circuit techniques can be used to practice this invention.

The oscillator 11 is essentially a Colpitts oscillator with a tank circuit in the plate circuit and having the feedback controlled by a cathode impedance. As will become apparent as the description proceeds, due to the simplicity of the microstrip components, distortion of the electrical characteristics resulting from relative mechanical movement has been virtually eliminated.

The oscillator vacuum tube 14 has a plate 15, a grid 16, a cathode 17 and a filament 18. Connected to the plate 15 is a microstrip line 19. The impedance of the microstrip line 19 is made inductive in order that this inductance L*p*, represented in FIG. 3, together with the grid-plate capacitance C*gp* will form a resonant tank circuit for the oscillator. As mentioned previously there are several methods known in the art to make the plate transmission line inductive. In the specific embodiment shown the transmission line 19 is R-F short circuited to the ground plane 13 at the end 21, and is less than one-fourth of a wave length long at the operating frequency of the oscillator. The frequency of the oscillator is determined mainly by the resonant frequency of the L*p*–C*gp* tank circuit, and may be varied by changing the length of strip transmission line 19.

The grid 16 is normally connected directly to the ground plane 13 at 22. But if grid pulsed operation is desired the grid is connected to the ground plane 13 by means of a capacitor, as will be explained in more detail subsequently.

Figure 3:
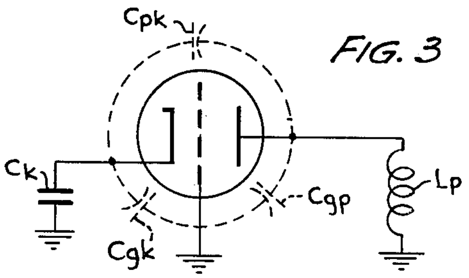
FIG. 3 is an R-F equivalent circuit of the oscillator shown in FIG. 1.

Connected to the cathode 17 is a microstrip line 23. The microstrip line 23 is made to have an impedance which is capacitive. While the generated frequency depends to some extent on the capacitive reactance in the cathode circuit, the primary function of the capacitive reactance C*k*, represented in FIG. 3, is to adjust the phase and amplitude of the cathode drive voltage to a proper condition for oscillation.

Methods have been developed to determine analytically the impedance of strip transmission lines—for example, "Theoretical Developments in Symmetrical Strip Transmission Line" by A. A. Oliner printed in the Proceedings of the Symposium on Modern Advances in Microwave Techniques, November 1954, published by the Polytechnic Institute of Brooklyn, Brooklyn, N.Y. However, it will usually be easier to determine the proper length for the transmission lines 21 and 23 by empirical methods using as a starting point the considerations set out above.

In the specific embodiment shown in FIG. 1 the output from the oscillator 11 is taken from the lead 25 which is connected directly to the cathode microstrip line 23.

Figure 4:
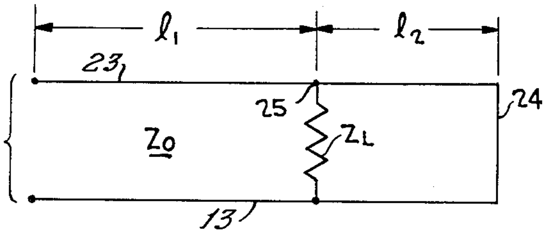
FIG. 4 is an R-F equivalent circuit of the cathode strip transmission line shown in FIG. 1.

FIG. 4 is an equivalent circuit of microstrip line 23, shorted at the end 24, with a load impedance $Z_L$ connected at 25. The length of the line, $l_1$ to the load and the length $l_2$ to the short 24 should be properly adjusted to give sufficient capacitive reactance, taking into account the shunting load impedance $Z_L$, to provide the proper feedback and to deliver power to the load efficiently.

An alternative arrangement to taking the output of the oscillator from a lead directly coupled to the cathode strip transmission line is to provide an additional strip transmission line 26. This additional strip transmission line 26 is placed parallel to the plate strip transmission line 19, and the output is taken from one end at 25'. In this case the output circuit is mutually coupled to the tank circuit capacitively or inductively.

Filament leads are provided at 27 and 28. These leads may also be printed microstrip lines. The filament supply source is connected between the ends 29 and 31. To isolate the R-F power from the filament supply, the microstrip lines 27 and 28 are made a quarter of a wave length long at the operating frequency of the oscillator and provided with an R-F ground at the ends 29 and 31.

Figure 2:
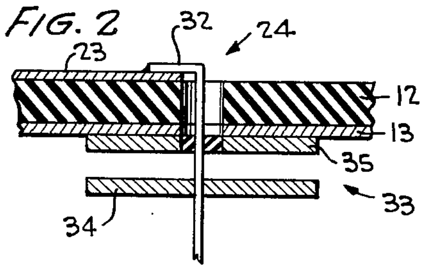
FIG. 2 is a partial detail section view of the oscillator shown in FIG. 1.

The R-F short circuits on the ends 21, 24, 29, and 31 are most easily provided either by shorting pins or the well known expedient of feed-through capacitors, depending on the use. FIG. 2 shows a detailed view of the end 24 which is typical of all the end connections where a feed-through capacitor is used. The strip transmission line 23 is connected by a feed-through capacitor 33 having a feed-through lead 32 which is attached at the end 24 and passes through the board 12. This lead is insulated from the ground plane 13. One plate, 34, of the capacitor is attached to lead 32 and the other plate 35 is connected to the ground plane 13.

A plate supply voltage is provided at the end 21 of the microstrip line 19. The plate supply voltage is isolated from the R-F energy by a feed-through capacitor similar to 33.

Figure 5:
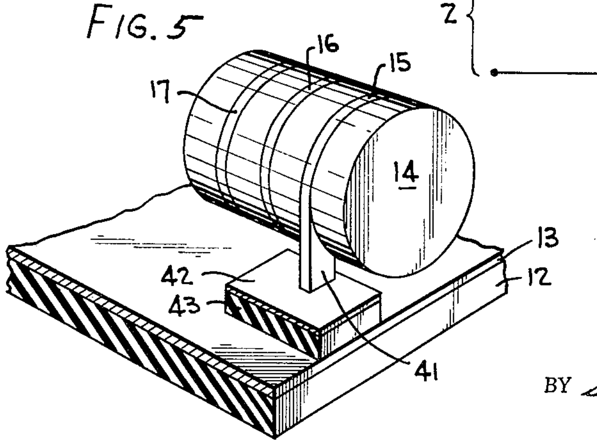
FIG. 5 is a detailed view of a short length tube connection.

The oscillator of this invention is capable of either continuous wave (CW), frequency modulation (FM), or pulsed operation. For CW operation the plate supply voltage is held constant. For pulsed operation the plate supply voltage is switched on and off by any of a number of pulsing techniques known in the art. An alternate method for pulsed operation is to provide an R-F ground for the grid 16 while providing D.C. isolation from the ground plane. This may be done either with the feed-through capacitor arrangement of FIG. 2 or, preferably, by means of a capacitor similar to that shown in FIG. 5. The structure shown in FIG. 5 is discussed in detail subsequently. Suffice it to say that this type of capacitor permits keeping the R-F length of the grid lead as short as possible. The grid potential may then be switched between cut-on and cut-off potential by any suitable pulsating D.C. bias voltage.

Figure 6:
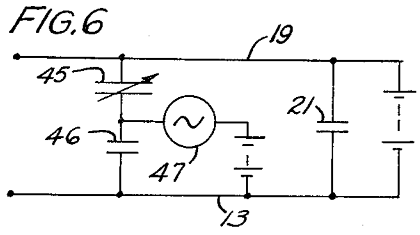
FIG. 6 is an equivalent circuit of the plate transmission line showing the connection of a varactor diode to permit FM operation.

For FM operation a varactor diode 45, illustrated schematically in FIG. 6, is connected from the plate microstrip line 19 to the ground plane 13 by way of a feed-through capacitor 46. A varying signal bias source 47 is connected across the varactor diode. The varying bias source causes the varactor diode capacity to vary, and this variation in diode capacity produces the effect of varying the plate microstrip line length.

As in any Colpitts oscillator it may be desirable to provide a cathode bias for CW and FM operation. This can be done with an oscillator constructed in accordance with the teaching of this invention simply by connecting a resistor from the feed-through lead 32 to the ground plane 13. For pulse operation it may be desirable to have a zero bias. In this case a shorting pin to the ground plane 13 may be used at the end 24.

As mentioned previously the frequency of the oscillator is primarily determined by the length of the microstrip line 19. The shorter the line the higher the frequency. To avoid the line length required to penetrate the board 12, the arrangement shown in FIG. 5 is used to obtain higher frequencies.

FIG. 5 shows the triode 14 which may be a General Electric ceramic triode 7720, with the plate 15, grid 16 and cathode 17. The connection to the plate electrode 15 is made by a tube stud 41. In the oscillator of FIG. 1 the stud 41 is insulated from the ground plane 13 and passed through board 12 where it is connected to the microstrip line 19. In FIG. 1 the same arrangement is used for the cathode 17, and the grid stud is normally bonded directly to the ground plane 13.

To shorten the plate electrode line as much as possible for higher frequency operation the stud 41 may be connected to a conducting plate 42 which is insulated from the ground plane 13 by a piece of insulation 43. The plate 42 and the ground plane 13 form a capacitor which provides an R-F short circuit between the plate 15 and the ground plane at the point where the stud 41 is connected to the plate 42. The plate supply voltage is applied to the plate 42 since the capacitor provides D.C. isolation from ground.

As mentioned previously, the arrangement shown in FIG. 5 has also been found the most satisfactory for use with pulsed grid operation. The pulsing grid voltage would be applied to the plate 42.

As will be apparent to those skilled in the art, the microstrip lines may also be made proportional to any odd multiple of a quarter of a wavelength. This, however, is not usually desired since it raises the possibility of spurious modes of oscillation.

One example of a 1000 mc. oscillator constructed in accordance with the embodiment of this invention shown in FIG. 1 has the following parameters:

| | |
|---|---|
| (a) Triode **14** | GE 7720 ceramic triode. |
| (b) Dielectric **12** | 1/16" Teflon fiber-glass. Dielectric constant 2.5–2.6. Propagation constant 70%. |
| (c) Ground plane **13** | 1 oz. copper. |
| (d) Microstrip **19** | 1 oz. copper. |
| Length | 3/4". |
| Width | 3/32". |
| (e) Microstrip **23** | 1 oz. copper. |
| Length | 4 3/32". |
| Width | 3/32". |
| (f) Distance $l_1$ (FIG. 4) | 2 13/16". |
| (g) Feed-through capacitor **33** | 15–50 $\mu\mu$f. |
| (h) Filament leads **27, 28** | 1 oz. copper. |
| Length | 2 3/16". |
| Width | 1/16". |

It will be apparent that the embodiment shown is only exemplary and that various modifications can be made in construction and arrangement within the scope of the invention as defined in the appended claims.

We claim as our invention:

1. A very high frequency oscillator which provides stable operation under severe environmental conditions comprising:
   (a) a high frequency electronic vacuum tube having a plate electrode, a control grid electrode, and a cathode electrode,
   (b) a thin sheet of insulating material having first and second parallel surfaces,
   (c) an electrically conducting ground plane of extended area bonded to said first surface of said thin sheet of insulating material and electrically connected to said control grid electrode of said high frequency electronic vacuum tube,
   (d) a first electrically conducting strip of limited area bonded to said second surface of said thin sheet of insulating material opposite said electrically conducting ground plane and electrically connected to said plate electrode of said high frequency electronic vacuum tube, said first electrically conducting strip and said electrically conducting ground plane forming a first transmission line having a length and termination to provide an inductive reactance which resonates with the plate-to-grid interelectrode capacitance of said high frequency electronic vacuum tube at the operating frequency of said oscillator to provide a tank circuit in the plate circuit of said oscillator, and
   (e) a second electrically conducting strip of limited area bonded to said second surface of said thin sheet of insulating material opposite said electrically conducting ground plane and electrically connected to said cathode electrode of said high frequency electronic vacuum tube, said second electrically conducting strip and said electrically conducting ground plane forming a second transmission line having a length and termination to provide a capacitive reactance to adjust the phase and the amplitude of the cathode drive voltage to the proper conditions for oscillation.

2. A very high frequency oscillator as defined in claim 1 wherein said electrically conducting ground plane is directly connected to said control grid electrode of said high frequency electronic vacuum tube to permit either continuous wave operation or pulsed operation by switching a plate supply voltage on and off.

3. A very high frequency oscillator as defined in claim 1 further comprising: a capacitor, said electrically conducting ground plane being connected to said control grid electrode of said high frequency electronic vacuum tube by said capacitor to provide an R-F short-circuit connection between said electrically conducting ground plane and said control grid electrode while providing D.C. isolation there between to permit pulsed operation by switching a grid bias voltage between cut-on and cut-off.

4. A very high frequency oscillator as defined in claim 1 further comprising:
   (a) a varactor diode having first and second terminals, said first terminal being directly connected to said first electrically conducting strip, and
   (b) a capacitor, said second terminal of said varactor diode being connected to said electrically conducting ground plane by said capacitor to provide an R-F short-circuit connection between said second terminal and said electrically conducting ground plane while providing D.C. isolation therebetween to permit frequency modulation operation by varying the capacitance of said varactor diode thereby producing the effect of varying the length of said first transmission line.

5. A very high frequency oscillator as defined in claim 1 further comprising: an output load, said output load being connected directly across said second electrically conducting strip and said electrically conducting ground plane at a point along the length of said second electrically conducting strip which permits sufficient capacitive reactance to provide the proper feedback and to deliver power to said output load efficiently.

6. A very high frequency oscillator as defined in claim 1 further comprising: a third electrically conducting strip of limited area bonded to said second surface of said thin sheet of insulating material opposite said electrically conducting ground plane and in close proximity to and in parallel relationship to said first electrically conducting strip, said third electrically conducting strip and said electrically conducting ground plane forming a third transmission line which provides a mutual coupling to said tank circuit for an output load.

7. A very high frequency oscillator as defined in claim 1 wherein said high frequency electronic vacuum tube further has a cathode heating filament having two terminals and said very high frequency oscillator further comprises: third and fourth electrically conducting strips of limited area bonded to said second surface of said thin sheet of insulating material opposite said electrically conducting ground plane and electrically connected to corresponding terminals of said cathode heating filament, said third and fourth electrically conducting strips and said electrically conducting ground plane forming third and fourth transmission lines having lengths and terminations to provide isolation of R-F power from a filament supply.

References Cited by the Examiner

UNITED STATES PATENTS

| | | | |
|---|---|---|---|
| 2,665,339 | 1/54 | Leng | 331—99 XR |
| 2,883,537 | 4/59 | Orr | 331—96 |

OTHER REFERENCES

Adams: "Microstrip for Microwave Circuitry," Radio-Electronic Engineering, April 1954, pp. 14, 15, 40, 42.

Army Technical Manual TM 11-673, "Generation and Transmission of Microwave Energy," June 18, 1953, page 114.

Barrett: "Etched Sheets Serve as Microwave Components," Electronics, June 1952, pp. 114–118.

ROY LAKE, *Primary Examiner.*

JOHN KOMINSKI, *Examiner.*